United States Patent

Rønnau

[11] Patent Number: 6,088,948
[45] Date of Patent: Jul. 18, 2000

[54] METHOD AND A DEVICE FOR TRAPPING RATS, MICE AND THE LIKE

[76] Inventor: Per Rønnau, Katterhøjvej 63, Højbjerg, Denmark, DK-8270

[21] Appl. No.: 09/428,653

[22] Filed: Oct. 28, 1999

Related U.S. Application Data

[63] Continuation-in-part of application No. PCT/DK98/00168, Apr. 29, 1998, abandoned.

[30] Foreign Application Priority Data

Apr. 29, 1997 [DK] Denmark ................................. 0476/97

[51] Int. Cl.[7] .................................................. A01M 23/10
[52] U.S. Cl. ............................ 43/72; 43/64; 43/70; 43/74
[58] Field of Search .................................. 43/64, 69, 70, 43/71, 72, 74, 73, 61, 58, 125

[56] References Cited

U.S. PATENT DOCUMENTS

| | | | |
|---|---|---|---|
| 4,641,456 | 2/1987 | Boharski | 43/73 |
| 4,741,121 | 5/1988 | Pratscher | 43/58 |
| 4,890,415 | 1/1990 | Fressola | 43/61 |
| 5,265,371 | 11/1993 | McCuistion, III | 43/70 |
| 5,815,982 | 10/1998 | Garretson | 43/121 |

FOREIGN PATENT DOCUMENTS

| | | |
|---|---|---|
| 0 395 135 | 10/1990 | European Pat. Off. . |
| 0 768 031 | 4/1997 | European Pat. Off. . |
| 670709 | 12/1989 | Switzerland . |

*Primary Examiner*—Jack W. Lavinder
*Attorney, Agent, or Firm*—Jacobson, Price, Holman & Stern, PLLC

[57] ABSTRACT

A trap for catching animals like rats, mice and similar comprises an entrance compartment (3), a detection unit (7), an activator (8) a door (4) and a unit (2) with confinement chamber. The confinement chamber may be filled with carbon dioxide in order to kill the animals. According to the invention, activation of the door means is inhibited until a counted has counted a predetermined number of visits. Hereby the animals are allowed to gain a certain familiarity with the trap, which makes it considerably more effective. The invention also provides a method for the trapping of animal.

20 Claims, 4 Drawing Sheets

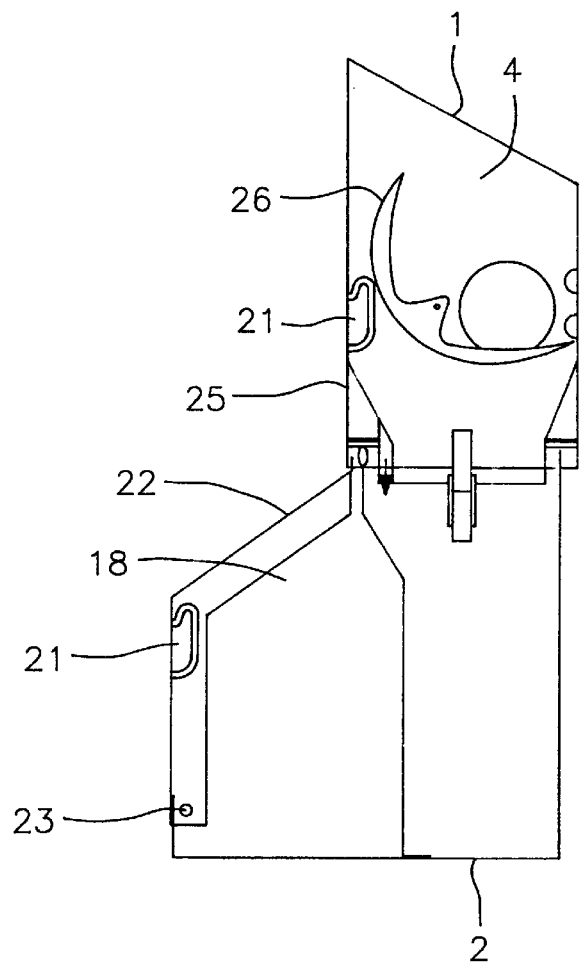
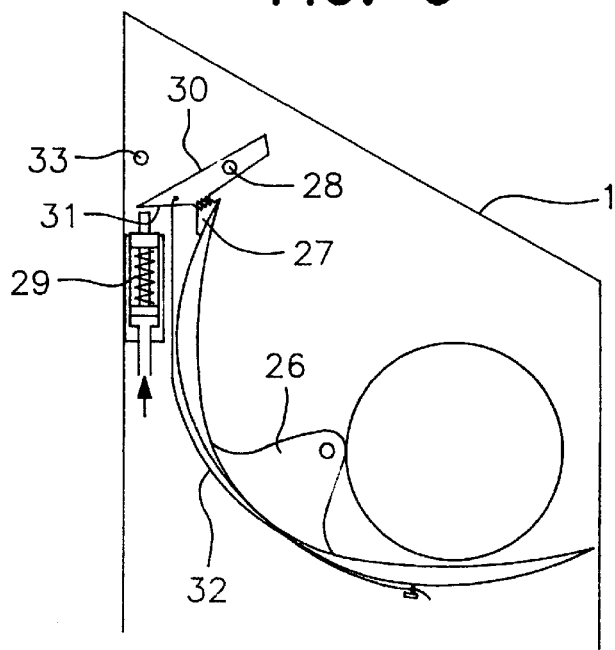

METHOD AND A DEVICE FOR TRAPPING RATS, MICE AND THE LIKE

CROSS REFERENCE TO RELATED APPLICATIONS

This is a continuation-in-part of International Application PCT/DK98/00168, with an international filing date of Apr. 29, 1998, now abandoned. This application is based on application No. 0476/97 filed in Denmark on Apr. 29, 1997, the contents of which are incorporated hereinto by reference.

FIELD OF THE INVENTION

The present invention relates to a method and a device for use in controlling animals like rats, mice and similar in a trap of the type wherein the animals are caught in a chamber and optionally killed by a gas, preferably carbon dioxide, wherein the animals are guided into the chamber via an entrance device connected with an activation mechanism which may be released by an animal via a detection unit.

Extermination of rats typically takes place by putting down poison or by trapping, the putting down of poison being the most widely used method. The use of poisonous substances is problematic per se, and the direct drawbacks of the use are well-known. They may be injuries in humans, e.g. in that children unintentionally eat some of the poison, or in livestock and pets, e.g. pigs, cows, cats and dogs, in that these eat some of the poison deposits put down. When the rats have been exterminated, there will typically be residues of the poison deposits, which are gradually spread to the detriment of the environment. However, one of the greatest problems is considered to be a rapid development of resistance in rats to even the most recent types of poison. According to persons skilled in the field this may mean that putting down of poison will be ineffective within a few years. Seen from an animal ethical point of view, the use of the existing poisonous substances causing the animals to die from internal bleedings, is moreover unethical. Notwithstanding this, the use of poison for the extermination of rats is still the most widely used method.

As regards trapping with traps of the prior art, this is considered to be relatively difficult even by persons skilled in the field, and is mostly used where the use of poison is outright prohibited or where it is undesirable or impossible for other reasons. This applies e.g. in the food processing sector, in the health sector and generally within buildings. Practical experience with the traps known in the market, such as latch traps and net traps, shows very clearly that the traps directly or indirectly impart negative experience to the rats being trapped which they may communicate to their fellow creatures which then avoid the traps. Caught rats can thus leave odor traces which warn the remaining animals of danger and make them keep away. Practice shows that those traps with the most gentle function are the most effective ones as the animals keep relatively calm.

THE PRIOR ART

The patent literature includes several examples of rat-traps. Thus, U.S. Pat. No. 4,741,121 and U.S. Pat. No. 4,566,218 disclose traps in which the rats are killed by carbon dioxide. The construction of these traps, however, is rather complex. The traps by their operation tend to make the rats scared and allow them the opportunity to communicate this to fellow creatures inter alia by leaving odor traces.

The invention is based on the finding that traps having a more gentle way of operation are more effective.

Accordingly, the object of the invention is to provide a method for control of the animals which is both effective and gentle.

SUMMARY OF THE INVENTION

The invention, in a first aspect, provides a method for use in the trapping of animals like rats, mice and similar animals, comprising the steps of admitting animals into an entrance compartment, detecting the entrance of an animal by means of a detection unit, incrementing a count of number of animal entrances in a counter, comparing the count to a predetermined first limit, and, in case said count has reached said first limit, activating a door means so as to admit an animal into a chamber, and closing said door means behind the animal to trap it.

In this method the animals are allowed to pass the detection unit of the trap and thus visit the entrance area of the trap several times before the entrance device to the chamber is activated, whereby the animals gain a certain familiarity with the trap. Some of the individuals are thus given the opportunity to visit the trap a couple of times before they are caught. They are hereby allowed to return to the group and communicate the positive experience they have gained with the trap. The animals can be made additionally confident vis-a-vis the trap in that, in contrast to the use of bait, actual feeding of the animals takes place in connection with the entrance device. The experience of the animals is that they can freely come and go in the trap as they want, and that they are fed. The occasional disappearance of one individual animal is not sufficient to alert its fellow creatures.

In most situations, such as in case of rats and mice, killing of the caught animals takes place, which may be done with a gas, preferably carbon dioxide. In some situations, e.g. when catching weasels, such as mink, it may be desired to keep these alive, e.g. in order to return animals which have escaped from a fur farm.

The invention, in a second aspect, provides a device for use in the trapping of animals like rats, mice and similar animals, comprising an entrance compartment, a detection unit adapted for detecting the presence of an animal in said entrance compartment and for incrementing a count of animals detected, activation means adapted for comparing said count to a predetermined first limit and for activating, once said count has reached said first limit, the release of a door means so as to admit an animal into a chamber, and the subsequent closing of said door means behind the animal to trap it.

By selection of material, construction, design and bait the trap may be made luring and tempting for the animals. The possibilities of the vermins getting negative experiences in and by the trap are eliminated, e.g. by avoiding repulsive shapes, surfaces, sounds, smells, etc., and by making the trapping and killing functions lenient, gentle, quick and comparatively noiseless, in order to keep to a minimum any pain or fear caused in the animals when they are caught and killed, and in order that the trap generally does not disturb or startle animals present in and around the trap.

Additionally, the trap may be designed to be left unattended for extended periods of time. Thereby the vermins may be left undisturbed for extended periods of time. This is made possible by automatic recharging of gas as well as by providing the trap with sufficient capacity for collecting a large number of killed individuals. This also generally reduces the cost of inspecting and emptying the trap.

The trap may be provided with an adjustable limiter device adapted to inhibit the operation of the trap, once the maximum number of vermins which the trap can hold has been reached. The maximum limiter may be based on electronic or mechanical counting. This eliminates the risk of overfilling with the associated implication that the trap might be blocked in a totally or partially open state with the possibility for the animals to communicate negatively with the fellow creatures.

In addition to familiarity with the trap, quick and lenient treatment of the animals during catching and killing is also extremely important.

When, according to the invention, the entrance device to the killing chamber is constructed as a self-closing drop door, a very gentle treatment of the vermins is obtained. A drop door moreover eliminates the risk of the animals communicating negatively with the surroundings. The drop door will disappear below the animal, without any possibility of the animal leaving warning odor traces on the door.

The device according to the invention may be embodied in the form of a closed box with the drop door mounted on the top.

A special embodiment of the drop door has a curved cross-section and is suspended rotatable about a longitudinal axis so that once the latch is released, the door rotates by the load of an animal standing on it. This embodiment is particularly suitable for use in traps with a tunnel into which the animals can crawl. When the axis of rotation of the door is offset relatively to the center of gravity of the door so that the door is rotated solely by the weight of the animal, a simple structure is obtained without power means for causing the rotation. When the door rotates, the animal chutes down into the killing chamber.

When using selected gases, e.g. carbon dioxide, ethical killing of trapped animals may be obtained, said killing being initiated with a quick, painless anesthetization which also precludes the risk that the animals will have time to communicate negatively with the surroundings e.g. before their dissipation of anxiety smells begins. It is important that the animals are anaesthetized quickly. This may be achieved by a design of the trap where the animals are killed by a gas heavier than atmospheric air, preferably carbon dioxide, and where the killing chamber is filled, at least partially, with the gas in advance so that the concentration is sufficient for anesthetization and killing of the animals. The animals will thus drop directly down into an atmosphere of poisonous gas, which contributes to quick killing, which in turn means that the animals will not have time to communicate negatively with their fellow creatures. The actual fall down through the drop door will not in itself cause the air to be knocked out of the animal, but will after all cause extra deep breaths which promote quick anesthetization. Additionally, with a curved shape of the drop door, the animals will tend to land on their back or side, which in turn has a positive influence on quick killing.

In principle, with a gas heavier than air, it is sufficient to fill the killing chamber at the installation or at a maintenance visit, but after all some gas will gradually be lost by diffusion, which may be compensated in that the trap is constructed such that the killing chamber is automatically replenished with gas from a gas reservoir at regular intervals.

To facilitate emptying of the trap and to avoid contact with the animals, the killing chamber may be provided with a drawer into which the animals fall and are killed. Particularly hygienic, the drawer may be lined with a bag in which the animals are collected. Alternatively, the chamber may be constructed such that the bag may be suspended directly in it. The use of a gas-tight plastics bag additionally reduces the diffusion of the gas.

A preferred embodiment of the trap comprises an aggregate of two units, viz. a catching unit with drop door and containing the operational mechanical/electronic parts in general and intended for mounting on top of the killing chamber, which constitutes the other unit. This facilitates the construction and maintenance of the trap. In another structure, at least the gas bottle is arranged in a separate compartment in connection with the killing chamber, preferably at the side of it, which provides good tilting stability as the gas bottle is relatively heavy in relation to the trap in general.

The functions of the trap may expediently be controlled by a microprocessor by means of which information on the number of animal visits may be collected and processed. Of course, it may be the same animals which pass the detector unit several times. The use of a microprocessor also permits easy adjustment of the limiting number of visits counted before releasing the trap, which may even be made self-adapting in dependence on the frequency of the visits. If the visits are quite frequent, indicating that many animals are present, the limiting number of visits may be increased, and conversely the limiting number may be reduced if the visiting frequency is low, indicating that there are only few animals. The adaptation of the limiting number of visits may of course also be designed purely mechanically, e.g. with a mechanical counter unit.

It will be appreciated that the trap may be provided with a switch for activating and deactivating the killing device, so that the trap may also be used for just catching live animals.

At certain locations, such as e.g. in the food industries, it is desired to watch a given area tor the presence of vermins. On the other hand, it is not desired to have armed traps which need regular attention if vermins are indeed rare in the area. This is solved according to the invention by arranging in the area a logging device with an entrance for the animals in connection with which a detection device is arranged for recording animals in the device. In the event that vermins in the area are recorded, traps may subsequently be armed for catching them.

The logging device itself may substantially correspond to a trap without chamber, drop door and killing device. For example, the logging device may be constructed as a detachable part of the trap, which may then be used separately. In the event that vermins are observed, the logging device may be coupled to the rest of the trap which is then armed.

BRIEF DESCRIPTION OF THE DRAWINGS

An example of a rattrap according to the invention will be described more fully below in connection with the accompanying drawing, in which:

FIG. 5 shows the rattrap from FIG. 4 in transverse section, FIG. 6 shows a portion of FIG. 5 to an enlarged scale and with further details, in particular details of a release mechanism for use in the rattrap according to the third embodiment.

DESCRIPTION OF THE PREFERRED EMBODIMENTS

Figure 1:
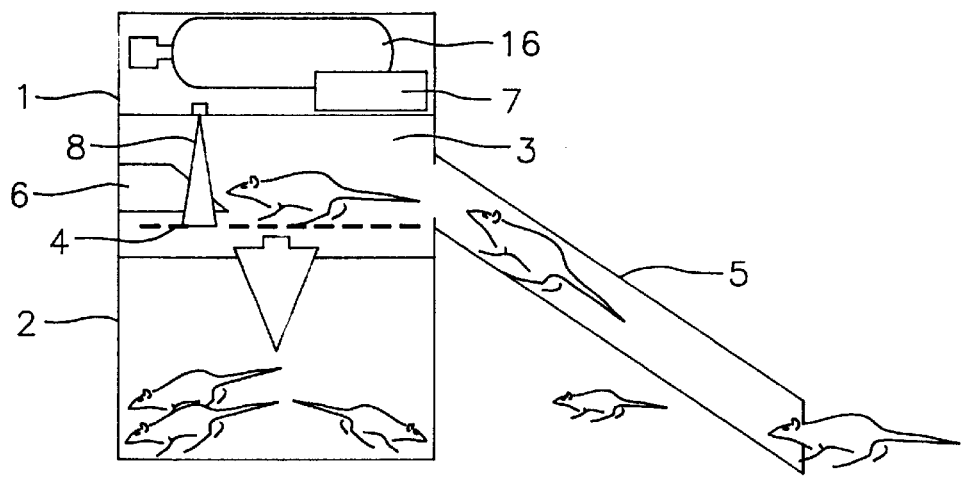
FIG. 1 schematically shows a rattrap according to a first embodiment of the invention as seen in longitudinal section, FIG. 2 schematically shows the rattrap of FIG. 1 as seen in a transverse section, FIG. 3 schematically shows a rattrap according to a second embodiment of the invention as seen in perspective.

All figures are Schematic and not necessarily drawn to scale and only show details deemed necessary for enabling those skilled in the art to practice the invention, whereas other details are omitted. All the figures use the same reference numerals for identical or similar items.

Figure 2:
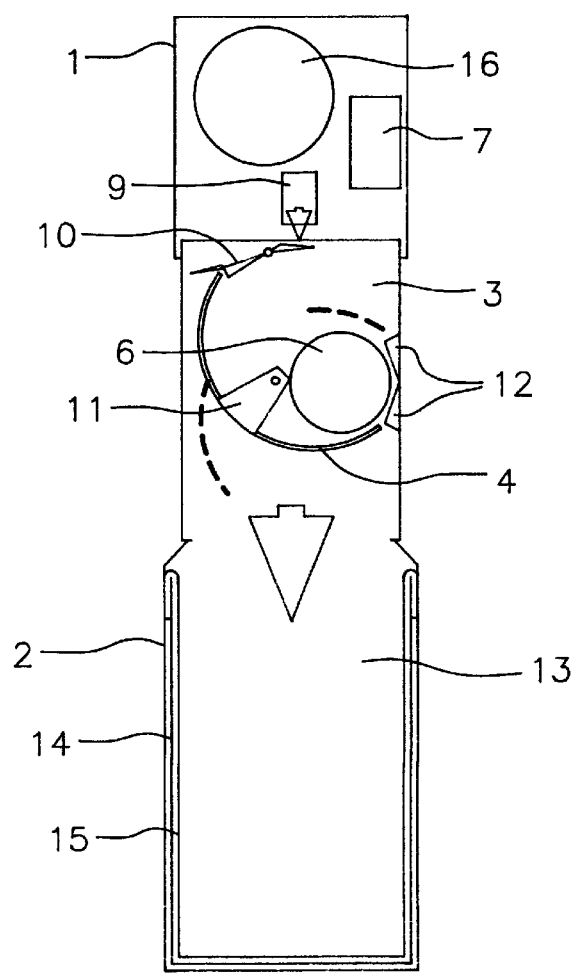

Reference is first made to FIGS. 1 and 2 for a description of the rattrap according to a first preferred embodiment of the invention.

In principle, the rattrap may be structured from two part units, viz. a catching unit 1 and an underlying killing unit 2. The catching unit 1 is formed with a longitudinal tunnel-shaped compartment 3 defined by the walls of the catching unit and a drop door 4 of curved cross-section. Entrance into the tunnel 3 is obtained via an entrance pipe 5 detachably connected on the end of the catching unit 1. A feed dispenser 6 with bait for the rats is provided opposite the entrance opening of the tunnel. The length of the tunnel is adapted so that only one rat at a time can be present in it. It is likewise ensured that the rats do not nest in the entrance pipe in that this is provided with side openings. The floor is rough, while the passages in general have smooth and/or soft shapes and faces to facilitate the comings and goings of the rats.

The various functions of the trap are controlled by an electronic control unit 7 which is battery-powered. A photoelectric sensor unit adapted for detecting the presence of a rat is positioned immediately in front of the feed dispenser in the ceiling of the tunnel. The sensor unit communicates with the control unit, which is moreover connected to an activator 8 in the form of a small air cylinder, alternatively an electromagnet which is activated by an electronically controlled air valve. This air valve operates a hold and release latch 9 for the drop door 4 which is rotatable suspended in the catching unit by a suspension at both ends. The activator is driven by compressed air from a carbon dioxide bottle, which is used for killing the rats, as will be explained later. The weight of the drop door and its offset suspension axis relative to the center of gravity are adapted so that the drop door, solely by the weight of a rat, rotates instantaneously when the door is released so that the rat falls, or rather chutes down into the underlying killing unit 2, and so that the door, by its own weight, returns to the starting position likewise instantaneously. To dampen the impact of the drop door against the side wall in the trap in the extreme positions, shock absorbers, e.g. rubber moldings, are provided on the points of impact.

The collection and killing unit 2 consists of a box 11 with an opening at the top defined by the drop door 4 and a box- or drawer-shaped insert 12 adapted for collecting the falling rats. The insert 12 may be pulled out from one end of the killing unit and may be lined with a plastic bag 13 for collecting the dead rats so that these may be collected and discharged in a packaged state. Thus, direct contact with the animals is avoided.

The insert is shown here as a pull-out drawer. In other embodiments it might be constructed as a tilting drawer. Depending on the connection between the catching and killing units, the drawer may be redundant. For example, if the catching unit is pivotally connected with the killing unit or may be lifted off, the actual killing unit may be provided with a collection bag or other form of disposable insert.

Carbon dioxide from a pressure bottle 16 with liquid carbon dioxide is used for killing the rats. To keep the operational parts of the trap assembled, the carbon dioxide bottle 16 Is arranged in the catching unit, from which a pipe leads down into the killing unit via a reduction and control valve and terminates at a distance above the bottom in the insert 12. Since carbon dioxide is heavier than atmospheric air, it will settle on the bottom of the insert that is filled about 70%, which has been found sufficient by experience to anaesthetize a rat within quite few seconds and subsequently kill it. As the rat falls down, the carbon dioxide will be stirred up in the entire chamber below the drop door, which promotes quick anesthetization of the rat.

Gradual loss of some of the carbon dioxide by diffusion cannot be avoided completely, but the process is slowed down when the insert is formed with an airtight plastics bag. The electronic control unit 7, which operates the control valve, may be set by a timer to replenish the insert with gas at regular intervals. One replenishment per 24 hours has been found to be sufficient.

Figure 3:
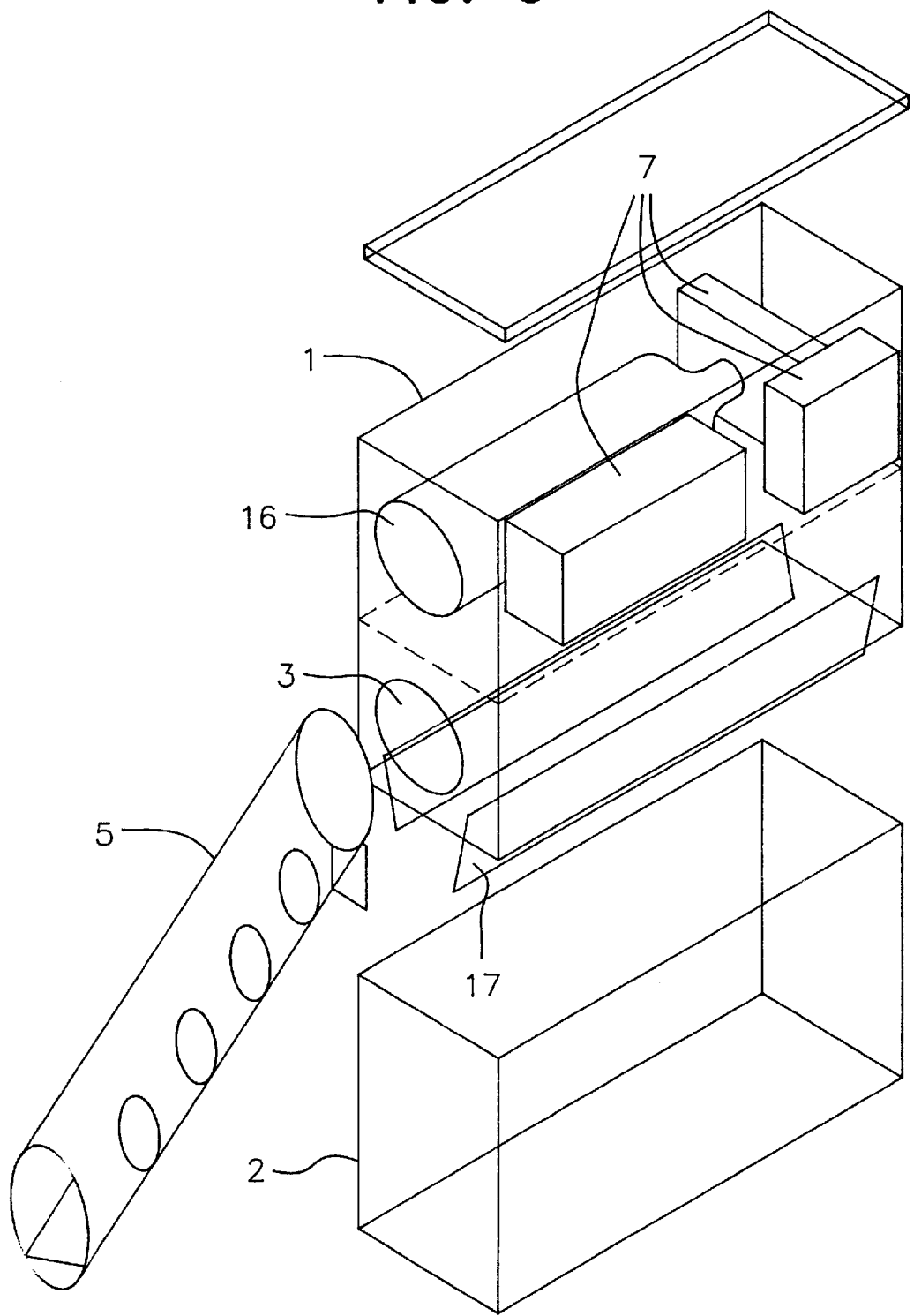

Reference is now made to FIG. 3 for a description of the rattrap according to the second embodiment of the invention. The rattrap of the second embodiment is constructed in basically the same manner as the trap according to the first embodiment, the difference being the structure of the drop door which is here constructed as two downward pivotable flaps 17, each hinged at the respective lateral sides. Other parts are similar to the first embodiment. Alternatively, the door may be constructed as a sliding door adapted for being pulled aside.

Figure 4:
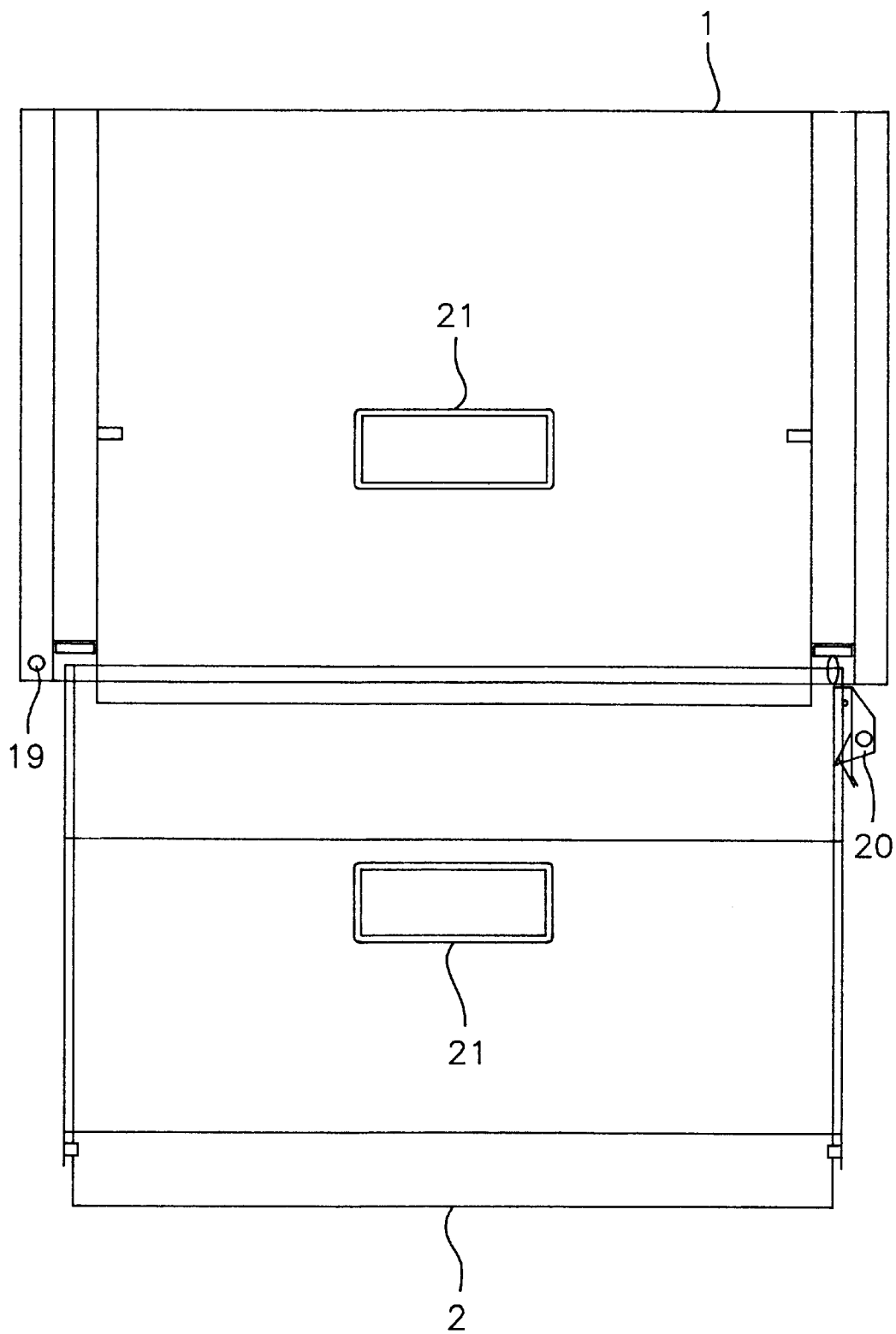
FIG. 4 shows a rattrap according to a third embodiment of the invention as seen in side view.

Reference is now made to FIGS. 4 and 5 for a description of a rattrap according to a third embodiment of the invention. This embodiment differs from the first and the second embodiment in that a separate utility chamber 18 is provided at the side of the killing chamber 13, said utility chamber being capable of accommodating gas bottle, valve and electronics. The upper part 1 has a drop door 4, feed dispenser and sensor unit in the same manner as the first embodiment. The upper part 1 is hinged 19 to the lower part 2 at the end opposite the entrance, so that it can tilt forward, and a closing buckle 20 for locking to the lower part 2 is arranged at the other end. Bowl-shaped carrier handles 21 facilitating the handling of the trap are secured in recesses in the sides. The outer wall 22 of the utility chamber 18 is hinged 23 at the underside about a longitudinal axis so that the wall may be pivoted down. In the closed position, the wall is kept in position in that the roof part has an upright flap which grips behind the outer wall 25 of the upper part 1. To allow opening, the upper part 1 must thus first be pivoted forwards to release the outer wall 22.

To stabilize the drop door 4, this is provided with end members having circular incisions adapted to the cross-section of the entrance 3.

Reference is now made to FIG. 6 for a description of details of an opening mechanism for use in the rattrap according to the third embodiment. The opening mechanism provides a means for positive opening of the drop door 4. The opening mechanism basically comprises a block 27 mounted adjacent the underside of the door. The block 27 is capable of cooperating with a release pawl 28. The mutual engagement faces are toothed or are provided with a frictional surface, so that the pawl holds the drop door in the starting position with certainty, as shown in the drawing. An air cylinder 29 connected with the gas bottle serves to release the pawl.

Activation of the cylinder causes its piston 30 to affect the pawl on the underside of its protruding nose portion 31 so that the pawl pivots upwards. The end of the pawl is connected by a pull wire 21 with the underside of the drop door so that the drop door is activated positively for rotation when the pawl is released. A stop 33 is arranged to limit the movement of the pawl. The stop is arranged so that the pawl automatically falls back to the starting position, and relatively quickly, in which it engages the engagement face on the block. In this respect, the pivot point of the pawl is arranged above its center of gravity, just as the point of attack of the pull wire is arranged on the other side of the pivot point of the drop door.

The opening mechanism of FIG. 6 is readily adapted to use with other embodiments of the rattrap according to the invention.

In principle, a device for logging rats or mice present in a given area may be integrated in the upper part 1 of the trap where the activation of the drop door is disconnected. Or a special device may be made for the purpose, i.e. with an entrance chamber, a feed device and an electronic unit, including sensor unit and indicator.

In the two first examples, the carbon dioxide bottle is placed in the catching unit, alternatively it may be placed in the killing unit as shown in the last example, where the lower position inter alia contributes to greater standing stability of the trap.

The invention thus provides an effective trap with an animal ethical killing form owing to its lenient treatment of the vermins.

Even though specific embodiments have been explained above, this explanation is not intended to limit the scope of the invention which is defined solely by the appended claims.

I claim:

1. A method for use in the trapping of animals like rats, mice and similar animals, comprising the steps of admitting animals into an entrance compartment, detecting the entrance of an animal by means of a detection unit, incrementing a count of number of animal entrances in a counter, comparing the count to a predetermined first limit, and, in case said count has reached said first limit, activating a door means so as to admit an animal into a chamber, and closing said door means behind the animal to trap it.

2. The method according to claim 1, comprising the step of providing a filling of gas in said chamber so as to kill any animals trapped in the chamber.

3. The method according to claim 2, comprising using for said filling of gas a gas which is heavier than air.

4. The method according to claim 1, comprising the step of providing a bait at said entrance compartment so as to guide animals into said entrance compartment.

5. The method according to claim 1, wherein the step of admitting the animals into said chamber comprises adapting said door means in the form of a drop door, adapted to swing away once activated, whereby the animal will drop into said chamber.

6. The method according to claim 1, comprising adapting said entrance compartment so that only one animal at a time can be present therein.

7. The method according to claim 1, comprising the provision of powered means to open the door means.

8. The method according to claim 1, comprising the step of providing a count of the number of animals trapped, setting a second limit, comparing said count of animals trapped with said second limit and inhibiting the release of said door means, once said count of animals trapped has reached said second limit.

9. A device for use in the trapping of animals like rats, mice and similar animals, comprising an entrance compartment, a detection unit adapted for detecting the presence of an animal in said entrance compartment and for incrementing a count of animals detected, activation means adapted for comparing said count to a predetermined first limit and for activating, once said count has reached said first limit, the release of a door means so as to admit an animal into a chamber, and the subsequent closing of said door means behind the animal to trap it.

10. The device according claim 9, comprising an animal feed site, where the animal can eat, after the passage of the animal by the detection unit.

11. The device according to claim 9, wherein said door means comprises a drop door adapted for being self-closing.

12. The device according to claim 11, wherein an animal feed site is adapted in order that an animal may feed while standing on said drop door.

13. The device according to claim 11, wherein said drop door is formed with a curved cross-section and is suspended rotatably about a longitudinal axis in order that said door, when activated, will rotate by the weight of an animal, so that an animal present on the door falls down into the chamber.

14. The device according to claim 9, wherein said detection unit comprises a non-contacting, passive detection unit, such as an optoelectric sensor.

15. The device according to claim 9, comprising means for providing a filling of gas in said chamber so as to kill any animals trapped in the chamber.

16. The device according to claim 15, wherein said means for providing a filling of gas is adapted to provide a filling of a gas, which is heavier than air.

17. The device according to claim 15, wherein said gas filling means is adapted for replenishing the chamber with gas at regular intervals.

18. The device according to claim 15, wherein said chamber is lined with a substantially gas-tight plastics bag.

19. The device according to claim 9, and provided in two interconnected main parts, a first part comprising said entrance compartment, said detection unit and said door means and a second part comprising said chamber.

20. The device according to claim 9, comprising means for providing a count of the number of animals trapped, means for setting a second limit, means for comparing said count of animals trapped with said second limit and inhibiting the release of said door means, once said count of animals trapped has reached said second limit.

* * * * *